United States Patent
Johnson et al.

(10) Patent No.: US 7,917,817 B2
(45) Date of Patent: Mar. 29, 2011

(54) USER INTERFACE MESSAGING SYSTEM AND METHOD PERMITTING DEFERRAL OF MESSAGE RESOLUTION

(75) Inventors: Clare C. Johnson, Mannheim (DE); Nicola C.A. Spielmann, Ramsen (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/656,410

(22) Filed: Jan. 28, 2010

(65) Prior Publication Data

US 2010/0138704 A1  Jun. 3, 2010

Related U.S. Application Data

(63) Continuation of application No. 11/320,708, filed on Dec. 30, 2005, now Pat. No. 7,676,705.

(51) Int. Cl.
*G07F 11/00* (2006.01)
(52) U.S. Cl. ........................................... 714/57
(58) Field of Classification Search .................. 714/57
See application file for complete search history.

(56) References Cited

U.S. PATENT DOCUMENTS

| | | | |
|---|---|---|---|
| 5,576,955 A | 11/1996 | Newbold et al. | |
| 6,192,381 B1 | 2/2001 | Stiegemeier et al. | |
| 6,240,414 B1 | 5/2001 | Beizer et al. | |
| 6,362,838 B1 | 3/2002 | Szlam et al. | |
| 6,438,716 B1 | 8/2002 | Snover | |
| 6,556,950 B1 | 4/2003 | Schwenke et al. | |
| 6,573,906 B1 | 6/2003 | Harding et al. | |
| 6,583,798 B1 | 6/2003 | Hoek et al. | |
| 6,690,390 B1 | 2/2004 | Walters et al. | |
| 6,820,237 B1 | 11/2004 | Abu-Hakima et al. | |
| 6,871,348 B1 | 3/2005 | Cooper | |
| 7,130,885 B2 | 10/2006 | Chandra et al. | |
| 7,478,340 B2 | 1/2009 | Parikh et al. | |
| 7,484,181 B2 | 1/2009 | Duperrouzel et al. | |
| 7,496,829 B2 | 2/2009 | Rubin et al. | |
| 7,526,322 B2 | 4/2009 | Whistler | |
| 2003/0103072 A1 | 6/2003 | Ko | |
| 2003/0210260 A1 | 11/2003 | Palmer et al. | |
| 2004/0054771 A1 | 3/2004 | Roe et al. | |
| 2004/0073868 A1 | 4/2004 | Easter et al. | |
| 2004/0078734 A1 | 4/2004 | Deuter | |
| 2004/0172552 A1 | 9/2004 | Boyles et al. | |
| 2004/0216036 A1 | 10/2004 | Chu et al. | |
| 2004/0216052 A1 | 10/2004 | Method | |
| 2004/0260820 A1 | 12/2004 | Bearman | |
| 2005/0005236 A1 | 1/2005 | Brown et al. | |
| 2005/0021748 A1 | 1/2005 | Garcea et al. | |
| 2005/0039137 A1 | 2/2005 | Bellwood et al. | |
| 2005/0114508 A1 | 5/2005 | DeStefano | |
| 2005/0138559 A1 | 6/2005 | Santos-Gomez et al. | |

(Continued)

OTHER PUBLICATIONS

Hints and Tips Quick Reference Guide, Jan. 6, 2005 (68 pages).

(Continued)

*Primary Examiner* — Bryce P Bonzo
(74) *Attorney, Agent, or Firm* — Finnegan, Henderson, Farabow, Garrett & Dunner, LLP

(57) ABSTRACT

A user interface messaging system and method that allows a user to defer resolution of the substance of a message, such as a user-initiated error, and adds the message to a queue. The messaging system may remind the user to resolve the substance of the messages in the queue. After a message has been added to the queue, the message layer may be closed, allowing the user to continue using the application.

20 Claims, 17 Drawing Sheets

U.S. PATENT DOCUMENTS

| | | |
|---|---|---|
| 2005/0166148 A1 | 7/2005 | Garding |
| 2005/0257162 A1 | 11/2005 | Danninger et al. |
| 2005/0283675 A1 | 12/2005 | Krebs |
| 2007/0113168 A1 | 5/2007 | De Souza et al. |

OTHER PUBLICATIONS

Richard Simon; Microsoft Windows 2000 API SuperBible; Sep. 13, 2000; Sams Publishing; p. 1 of supplied reference (marked as p. 7 of 81); ISBN 0-672-31933-0.

USER INTERFACE MESSAGING SYSTEM AND METHOD PERMITTING DEFERRAL OF MESSAGE RESOLUTION

RELATED APPLICATIONS

This is a continuation of application Ser. No. 11/320,708, filed Dec. 30, 2005, now U.S. Pat. No. 7,676,705 the contents of which are incorporated herein by reference in their entirety. The subject matter of this application is related to "User Interface Featuring a Tailored Messaging System and Method," Ser. No. 11/320,957, filed Dec. 30, 2005; "System and Method for Visual Messaging, Ser. No. 11/320,693, filed Dec. 30, 2005; and "System and Method for Combining Multiple Software Panes," Ser. No. 11/320,712, filed Dec. 30, 2005, each of which is fully incorporated herein by reference.

TECHNICAL FIELD

This invention relates generally to computer system user interfaces, and more specifically to methods and systems for providing enhanced error handling and solving.

BACKGROUND

In today's business environment, employees often must resort to many sources of information and means of communication to effectively perform tasks as part of their responsibilities. Increasingly, those tasks require receiving, locating, editing, or creating information using computer programs. These programs may include software for email, word processing, accounting, presentation, and scheduling, such as Microsoft Outlook, Word, PowerPoint, Excel, Lotus Notes, Lotus Organizer, and Adobe Acrobat. Certain business roles also require accessing or manipulating data stored in large databases, such as enterprise solution software. These enterprise packages provide a single entry point for all information, applications, and services that people need to do their jobs. They provide a way for suppliers, customers, partners, and employees to access all relevant content easily and securely, and to participate in all types of business processes. Since information and applications are unified, users can identify and address business issues faster, more effectively, and at a lower cost. Specific enterprise solutions may exist for assisting a company with, for example, enterprise resource planning, customer relationship management, human resource management, and supply chain management.

An example of an enterprise solution is the R/3 System from SAP AG. R/3 is an online transaction processing system designed to provide integrated processing of business routines and transactions. It includes enterprise-wide, integrated solutions, as well as specialized applications for individual and departmental functions. The R/3 system mirrors the business-critical processes of the enterprise—finance, manufacturing, sales, and human resources. It also offers various analytical capabilities to supplement the transaction processing function. The R/3 System is based on SAP's client/server architecture which separates the database, application, and presentation components for greater flexibility. This enables enterprises to take advantage of the various benefits of the architecture, including the capability to run across a variety of today's most popular UNIX-based hardware platforms.

Given the complexity of the applications and enterprise solutions in use today, providing the user with feedback is essential. The most common method of providing the user with feedback is through a messaging system. Conventional messaging systems provide the user with feedback by displaying a message window on the screen, the message window containing one or more action buttons. For example, if the user has initiated a processing operation, a message window may appear after the processing has completed. The message window may be centered on the user's display device, may be statically located so that the user cannot move the message, and may contain an action button such as "OK" that the user must select before the user can proceed with using other features of the application or enterprise solution. These message windows are typically passive, in that the user often has minimal options for interaction in the message window. While this conventional messaging system may be sufficient under some circumstances, it is often lacking, particularly when the user has been provided with feedback to indicate that a user-initiated error has occurred.

User-initiated errors are commonplace. The most common user-initiated errors are typographical errors, errors caused by the user requesting data not present in a database ("request-for-missing-data errors"), errors caused by some other error in a related entry ("dependency errors"), and errors caused by the user not providing required information ("missing-but-required-entry errors"). When an error occurs, the user interface notifies the user of the error, typically in a new pane on the user's display device. Upon display of this notification, the user's options are limited, typically only allowing the user to acknowledge the error, and not providing the user with any tools to fix the error.

To resolve the error, the user is often forced to proactively "pull" (i.e., locate and retrieve) information from a complex set of resources, maneuvering up and down complex structures of "trees" to find or modify the information necessary to resolve the error. Consequently, to effectively resolve errors, users must both know how to navigate through each program and know where data is located that is necessary for resolving an error. Even with this knowledge, users must wade through vast amounts of extraneous information to get to the data that is needed. They rarely, however, need the full resources or depth of information available. Therefore, business users may spend an inordinate amount of time accessing and manipulating data in the course of resolving errors. The organization also suffers, expending significant resources to train users on how to resolve different types of errors.

Adding to the user's challenge in addressing and resolving errors, error notifications are cryptic or provide very little information to the user, making it difficult for novice or even moderately experienced users to understand the error, much less how to correct it. This conventional messaging system results in frustration for the user who has to either resolve the error herself or expend time or other resources seeking help to resolve the error. Additionally, conventional messaging systems may require errors to be resolved sequentially, so the relationship between errors, if any, cannot readily be determined. Consequently, business users may spend an inordinate amount of time addressing messages and resolving errors in the course of fulfilling their responsibilities.

Further complicating error resolution is that not all errors can be resolved by all users. For example, the user may not have authorization to make the change(s) necessary to resolve an error. Current error messaging systems do not effectively differentiate between authorization levels or roles in an organization to provide user-specific feedback on the steps necessary to resolve the error. Thus, an unauthorized user may receive the same generic error message as a user who does have the necessary authorization. This environment often results in users needlessly expending resources attempting to understand and resolve errors that they are unable to fix themselves.

As demonstrated, conventional messaging systems are often inefficient and are not up to the task of providing users with the tools necessary to address the substance of its messages. The present invention is directed overcoming one or more of the deficiencies described above.

SUMMARY

A method of providing a user interface messaging system comprises displaying a message on a display device, receiving a command from a user to defer resolution of the substance of the message, and adding the message to a queue that thereafter comprises the message. The method may further comprise reminding the user to resolve the substance of the message and/or closing the layer that comprises the message.

A computer-readable-medium comprising instructions, the execution of which causes a computer to perform the method comprising displaying a message on a display device, receiving a command from a user to defer resolution of the substance of the message, and adding the message to a queue that thereafter comprises the message. The method may further comprise reminding the user to resolve the substance of the message and/or closing the layer that comprises the message.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

Figure 1:
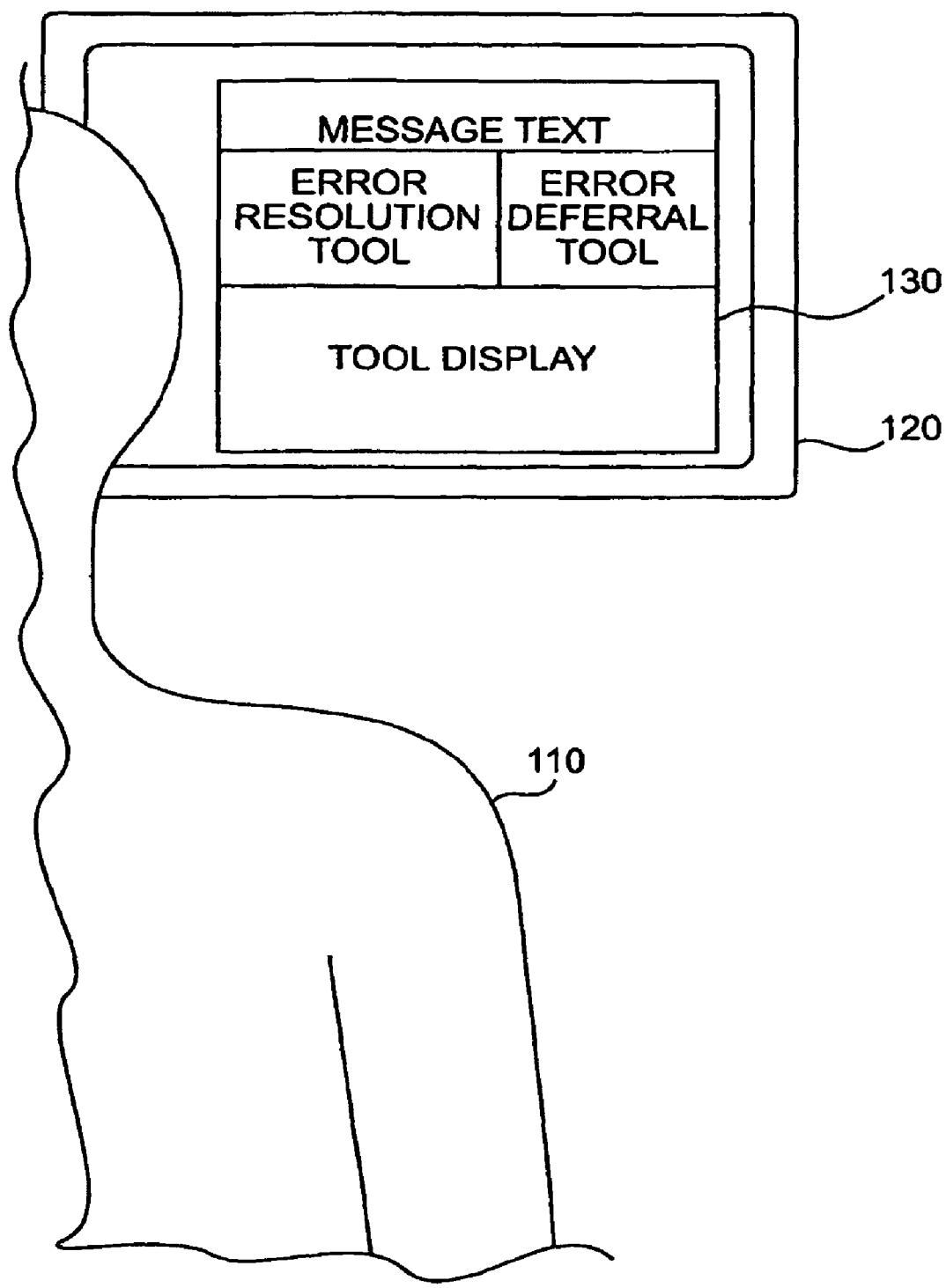
FIG. 1 is an over-the-shoulder view of a user seated at a computer system with a user interface containing a messaging system consistent with the principles of the present disclosure.

The following description refers to the accompanying drawings in which, in the absence of a contrary representation, the same numbers in different drawings represent similar elements. The implementations in the following description do not represent all implementations consistent with the principles of the claimed invention. Instead, they are merely some examples of systems and methods consistent with those principles. Several of the drawings represent screenshots of potential implementations of the invention, but are not necessarily indicative of an actual implementation of the invention or of an actual business scenario.

As embodied herein, a messaging system and method provides the user with improved messaging. Unlike conventional messaging systems, which often force a user to sort through extensive databases or tree-like file structures to find data in a computer system, the present messaging system "pushes," or presents, selected information to the user to assist in addressing the substance of the message. Consequently, a messaging system consistent with the principles of the present teachings provides information to the user based on the type and context of the message. As a result, message resolution is simplified, thereby increasing the user's efficiency.

The present messaging system may also contain several additional enhancements. Messaging consistent with the present teachings may be adapted for a user based on the user's traits, such as her role in the organization, her authorization level, or both. The messaging system may also offer the user the possibility of merging multiple steps, or portions of steps, of, for example, a guided activity, into one pane. For example, when a message such as an error message involves data from several forms, the relevant forms may be displayed in a single window to allow the user to more easily address the cause of the message. Furthermore, the present messaging system may provide message resolution tools to assist the user in addressing the substance of the message.

The present error messaging system may also allow the user to defer addressing the substance of a message. This messaging system stands in stark contrast to conventional messaging systems, particularly error messaging systems, that do not permit users to defer error resolution and require users to address the substance of all messages before proceeding.

The present error messaging system may also provide improved messaging by presenting messages with visual effects sufficient to catch the user's attention, placing the message in proximity to the field or record related to the message, and placing the message in a movable layer so that the user can place the message wherever the user deems fit.

The present error messaging system may be better understood with reference to the drawings, which provide one example of a messaging system consistent with the principles of the invention. The particular messaging system described herein relates to the identification, handling, and resolution of errors, although the principles of the messaging system also apply to message types other than error messages.

Turning to the drawings, FIG. 1 is a drawing of a computer user 110 viewing display device 120. Display device 120 displays a user interface utilizing a messaging system consistent with the principles of the present disclosure. As shown, the messaging system may utilize an exemplary message pane, in this case error message window 130. As used herein, a window may comprise one or more panes. If only one pane is present in a window, then the window and the pane are substantially coextensive.

Figure 2:
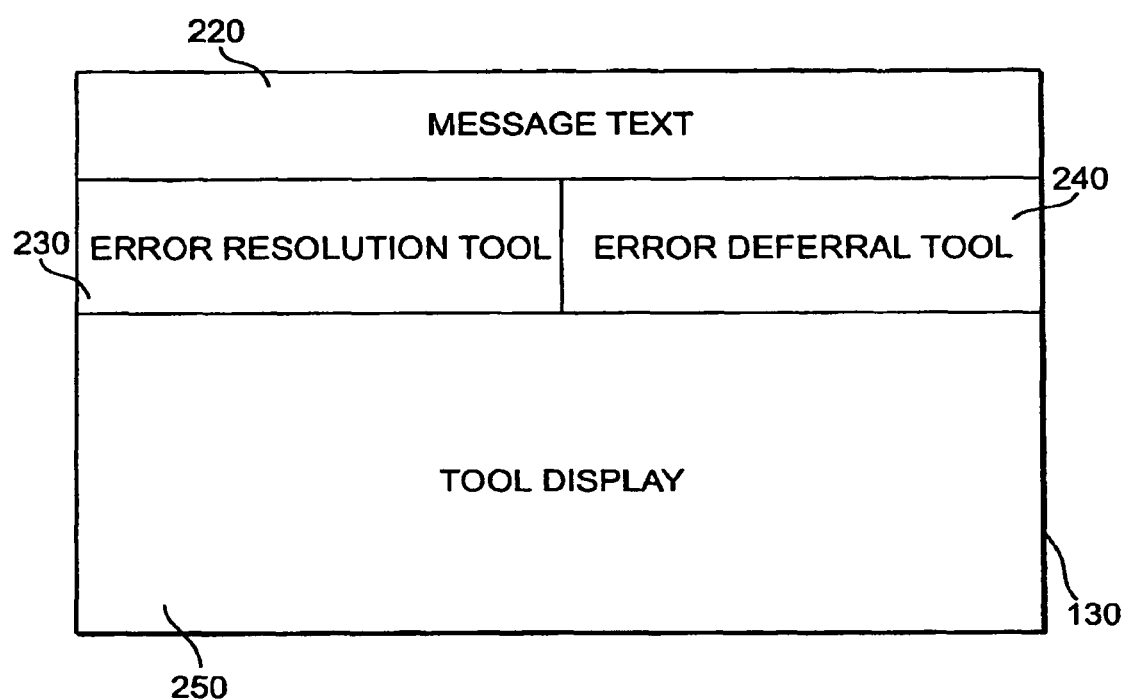
FIG. 2 is an exemplary template for a message consistent with the teachings of this disclosure.

FIG. 2 illustrates an exemplary error message window 130. An error message window 130 may comprise one or more of the following components: a message text pane 220; an error resolution tool pane 230; an error deferral pane 240; and a tool display pane 250. One of ordinary skill in the art will recognize that the components forming error message window 130 may take various shapes, sizes, and positions. The format illustrated in FIG. 2 is but one example.

Message text pane 220 may provide a title and messaging or explanatory text that will assist the user in understanding the error that is to be resolved through the use of the error message pane. The text provided in message text pane 220 preferably identifies the type of error in a manner that will be readily understood by a novice user, avoiding cryptic error messages commonly found in conventional messaging systems. The message text displayed may be adapted based on the user's traits, such as her authorization or role in the organization.

Error resolution tool pane 230 may provide one or more user interface options, such as links, to tools that assist the user in understanding and resolving the error. Like the message text discussed above, the tools may also be adapted to the user's traits. For example, a user who does not have authorization to create a new entry in a database may be provided an option to request the creation of a database entry. A user who has the appropriate authorization may instead be provided an option to create the database entry.

The error deferral pane 240 may provide the user with at least one error deferral tool. This pane may contain an interface option, such as a link or button, that, when selected, will put the message in a message queue, and the user may request to view the queue at a later time.

The optional tool display pane 250 may present error-related information or tool(s) to the user. One of ordinary skill in the art will recognize that many potential tools may be displayed in this pane. For example, the tool(s) displayed in this pane may also comprise partially pre-filled forms to assist the user in resolving the error.

Figure 3:
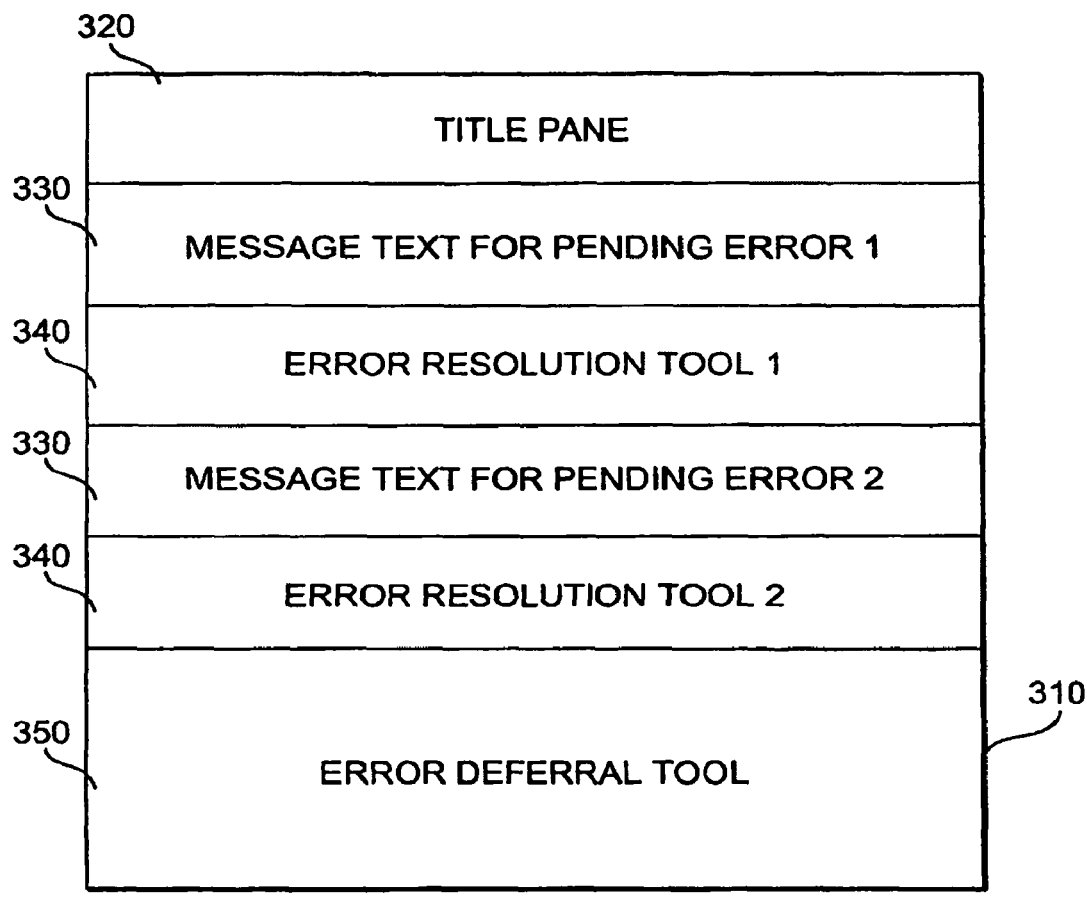
FIG. 3 is an exemplary template for a queue of errors awaiting resolution.

If the user elects to defer error resolution, the user may later wish to view the pending errors. FIG. 3 illustrates an exemplary error queue window 310 containing a queue of pending errors. An error queue window 310 may comprise one or more of the following building blocks or components: a title pane 320; one or more pending error panes 330; one or more error resolution tool panes 340; and an error deferral tool pane 350. The title pane 320 may provide a title and messaging or explanatory text that will assist the user in understanding number and nature of the errors still pending. The text provided in the title pane 320 may inform the user of the number of errors she can resolve directly as well as the number of errors she is not authorized to resolve herself. Once again, this message text may be adapted based on the user's traits.

In the pending error panes 330, errors that remain to be resolved are identified in the message text. The example error queue window 310 contains two pending error panes 330, but any number of pending error panes 330 may be present depending on the number of errors that remain pending. The error resolution tool panes 340 may contain error resolution tools as previously described. As with the pending error panes 330, the number of error resolution tool panes 340 will vary depending on the number of errors that remain pending. Error deferral tool pane 350 may contain one or more error deferral tools. For example, the user may be provided a "Remind Me Later" link or button, which would allow the user to continue deferring resolution of the error(s).

FIG. 3 provides only one example of how an error queue window may be configured. Another layout may separate the errors that a user has authorization to resolve from those errors that the user does not. Still another layout is a side-by-side configuration that places each pending error pane 330 next to its corresponding error resolution tool pane 340. Other layouts will be apparent to those of skill in the art, and they are intended to be encompassed within the scope of these teachings.

Figure 4:
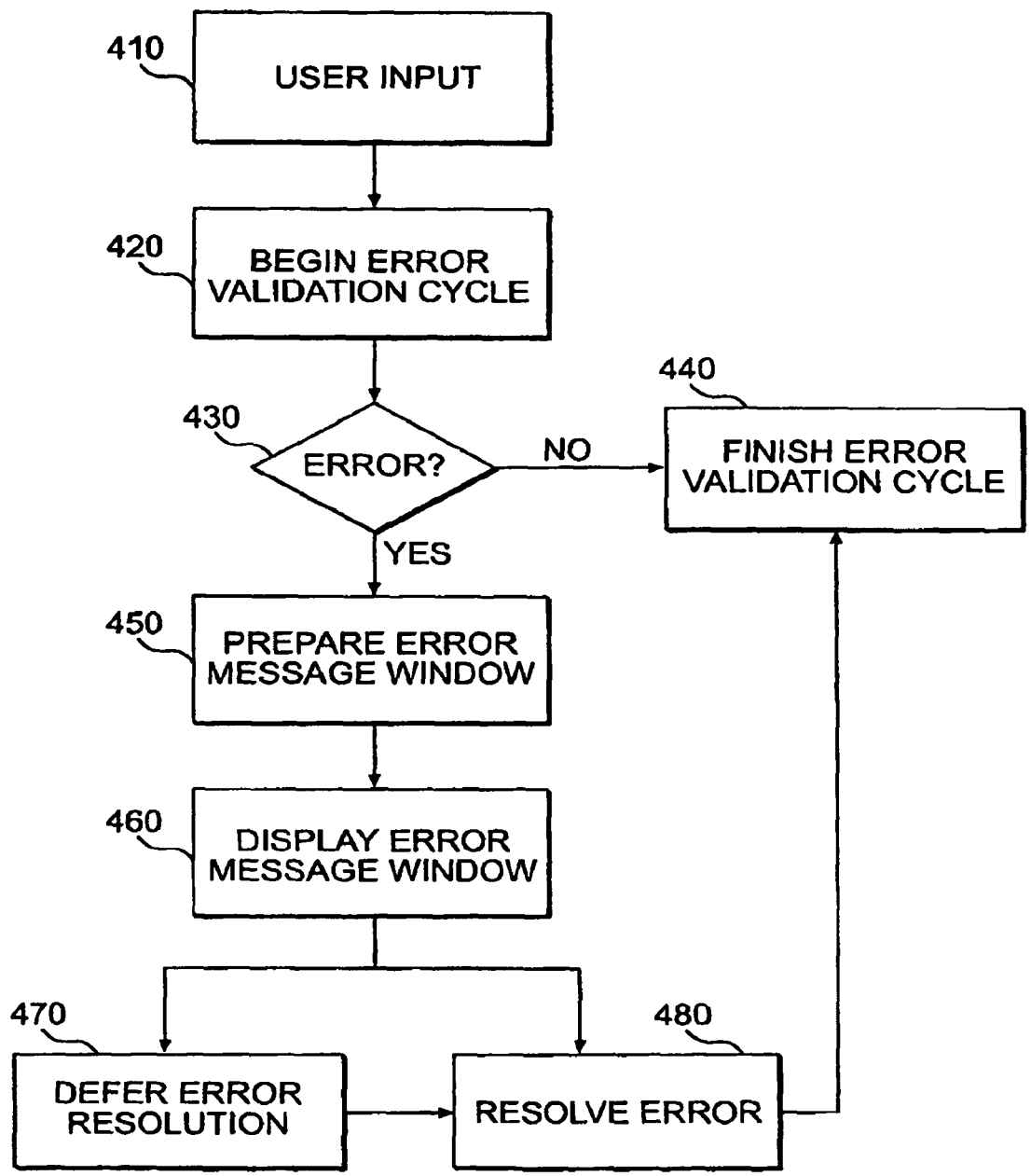
FIG. 4 is a process flow diagram of an error messaging system.

FIG. 4 is a flowchart of an exemplary method of error messaging consistent with the present teachings. In this example, a user provides input to an application or enterprise solution (stage 410). At some point thereafter, an error validation cycle is started (stage 420). This error validation cycle may be started, for example, by a user moving to another field in a database or moving to the next stage of a guided activity (or "wizard"). A guided activity or wizard typically comprises one or more discrete windows that lead a user stage by stage through a multistage process. In this manner, information may be progressively presented to the user in discrete stages that may be easier for the user to address than if the user were presented with every stage at one time.

After the error validation cycle has started, the application or enterprise solution may determine whether an error has occurred (stage 430). Potential errors may include, for example, typographical errors, request-for-missing-data errors, dependency errors, and missing-but-required-entry errors. If no error has occurred, the error validation cycle is complete (stage 440).

If the application or enterprise solution detects an error, the application or enterprise solution prepares an error message window 130 (stage 450). The preparation of the error message window, which is discussed in more detail below, may include preparing text and selecting tools based on a user's traits, such as her role or authorization level.

After the error message window has been prepared, the user interface may display it (stage 460) in a message layer. The message layer may be movable, allowing the user to reposition it as he or she wishes. When the user interface displays the message layer, it may do so with a visual effect sufficient to catch the user's attention. Many visual variations may accomplish this task. As an example, an animated effect may be used wherein the error message pane begins as a dot and grows outward to display the entire message. The message may also contain colors that contrast with the background to distinguish it from a standard user interface window. When possible, the user interface may place the error message on the display device in proximity to the field causing the error, so that the user is visually guided to the likely source of the error. While the particular circumstances at issue will determine the proximity of the message to the error, one option is to place the message directly below the field or record causing the error.

Once the error is displayed, the user may resolve the error, or may defer resolution of the error until a later time (stage 470). At some point, the user may resolve the error (stage 480), and the error validation cycle is completed (stage 440).

At stage 450, several processes may occur individually or collectively. For example, the present error messaging system may be adapted for a user based on the user's traits. Such traits may include a user's role in her organization, her authorization level, or any other information that may be useful in customizing an error message. Generally, a user's role refers to her position or responsibilities. For example, a user in the role of a purchasing agent for a manufacturing company may have the responsibility for procuring raw materials. Tasks affiliated with that role may include issuing purchase orders to suppliers, negotiating changes to existing purchase orders, and monitoring delivery of materials. Given the user's role in the organization, the user may grasp terminology or have an understanding of the purchasing process that, say, a person in a marketing role may not understand. Thus, the information pushed to the purchasing agent to resolve an error via the present messaging system may be different from the information pushed to a user in a marketing role who generates the same error. That is, a user in a marketing role may need a more basic explanation of a purchasing-related error than a purchasing agent. Likewise, a purchasing agent may need a more basic explanation of a marketing-related error than a user in a marketing role. Rather than provide the same message to both users as found in conventional messaging systems, the present messaging system may provide these individuals with different messages containing different tools for addressing the substance of the message.

A user's authorization level refers to the user's ability to create, access, or modify information in the application or enterprise solution. For example, a manager may have authorization to create new database entries, such as adding a new supplier, whereas another employee may not be authorized to make such an addition. An error message consistent with the teachings of this disclosure may be adapted based on these differences in authorization within an organization or across organizations. For example, a user who is authorized to create a new database entry may be provided with a link to a tool for the creation of a new database entry whereas a user who lacks authorization may be provided with an interface option such as a link to a tool for requesting creation of the new entry by an authorized user. Those skilled in the art will appreciate that a message consistent with the present teachings may take many forms and is designed to empower each user to resolve errors in a streamlined fashion.

Figure 5:
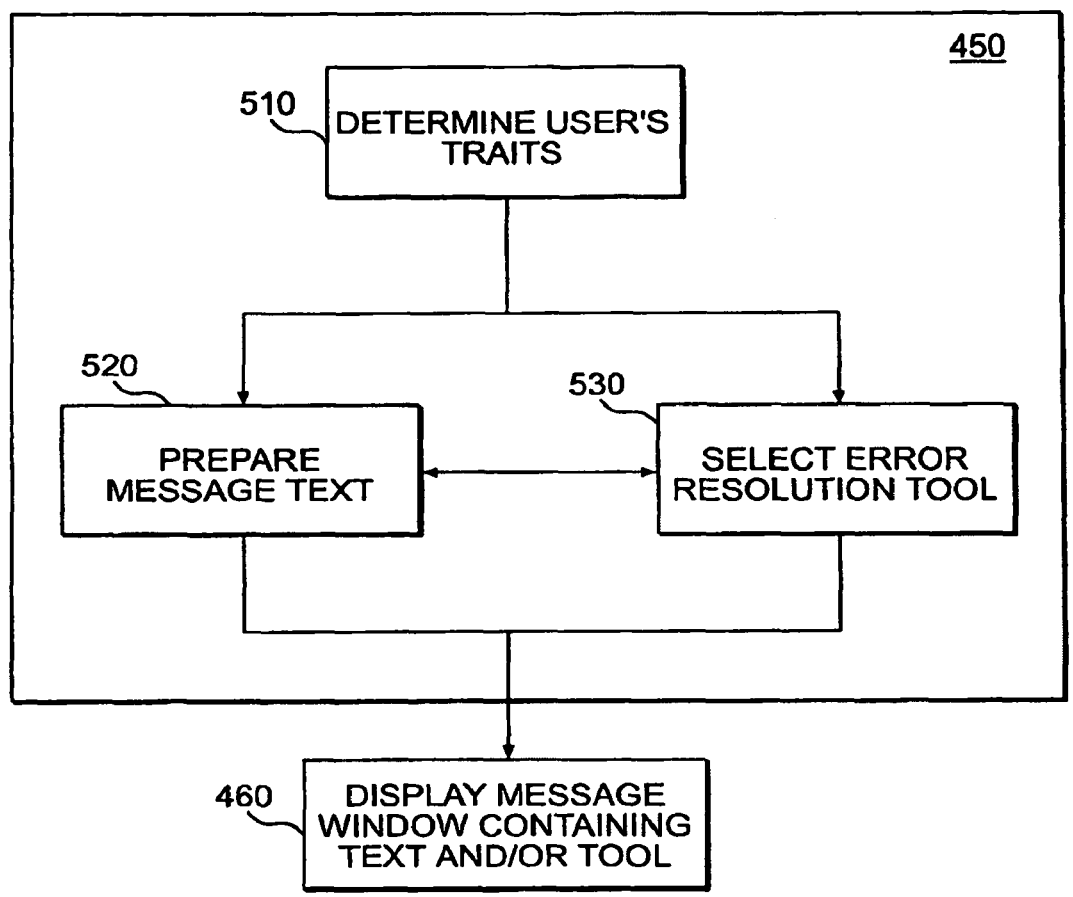
FIG. 5 is a process flow diagram of a messaging system that customizes its messages based on a user's traits.

FIG. 5 is a flowchart of an exemplary method of preparing an error message based on a user's traits. This process may occur as part of stage 450, which includes the preparation of an error message window. The application or enterprise solution may determine the user's traits (stage 510), which may include the user's role, authorization level, or any other information that may be useful in customizing an error message. To determine the user's traits, the application or enterprise solution may access a database containing trait information, and this database may be located on the user's system ("client computer") or on a remote server ("server computer").

Message text is generated that may be customized based on the user's traits (stage 520), and the application or enterprise solution may select error resolution tools based on the user's traits (stage 530). As illustrated in FIG. 5, these stages may be performed in any order, and there is no requirement that both stages be performed for each error. After performing one or both of stages 520 and 530, the application or enterprise solution displays a message window (stage 460) containing the text, tool(s), or both, selected at stages 520 and 530.

Referring again to FIG. 4, at stage 470 the user may choose to defer resolution of the substance of the message. As used herein, the "substance" of the message refers to the reason that the message is provided to the user. In the case of an error, the substance of the message is that an error occurred that may need resolution. To resolve the substance of an error message is to resolve the error or errors that caused the message to be displayed in the first instance.

Figure 6:
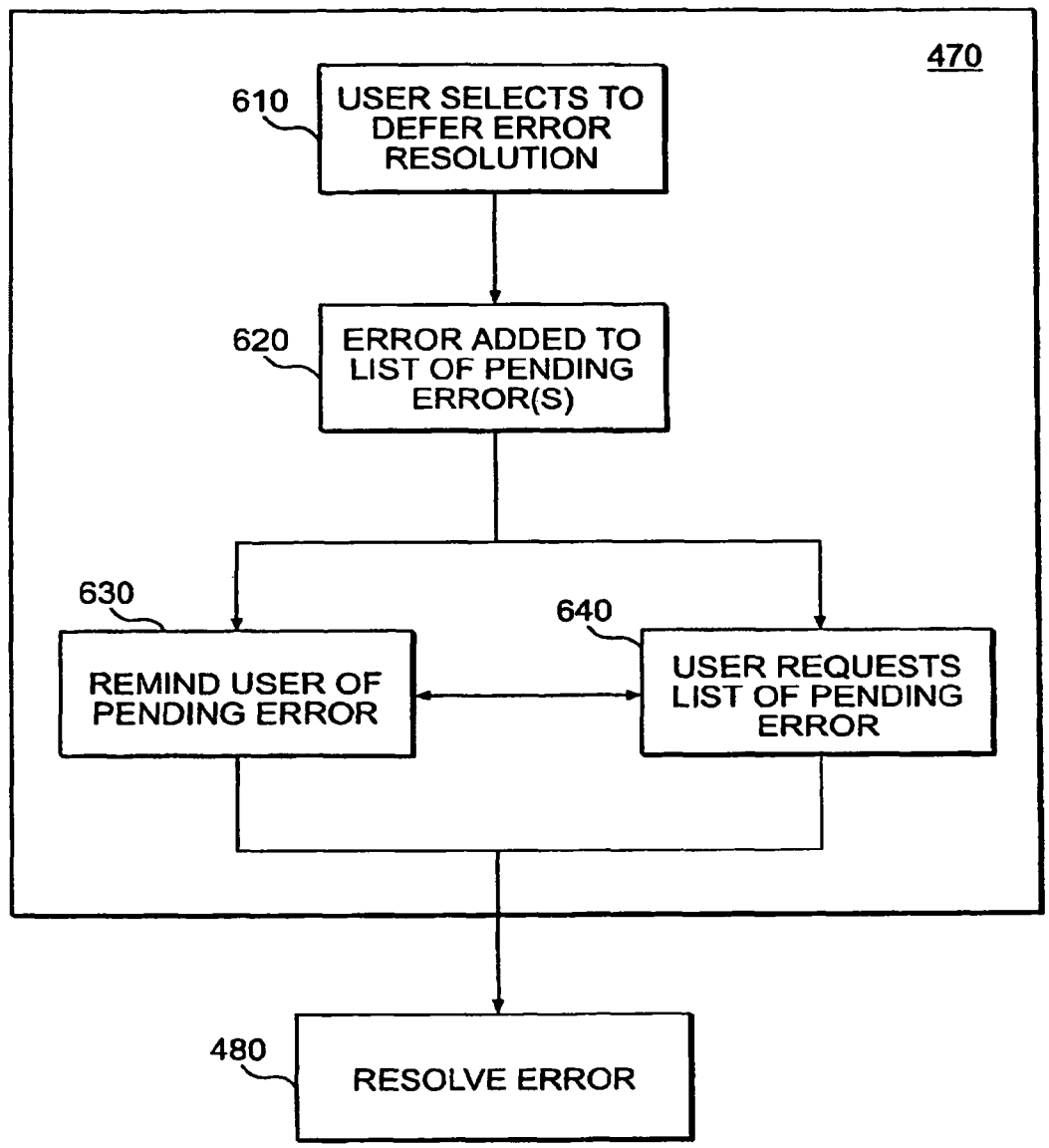
FIG. 6 is a process flow diagram of a messaging system that allows a user to defer error resolution until a later time.

FIG. 6 is a flowchart of an exemplary error deferral process (stage 470). The user may select to defer error resolution by interacting with a user entry point (e.g., selecting a button or link) (stage 610). For example, the user interface may offer a "Defer Error Resolution" button or a "Remind Me Later" button. The application or enterprise solution may add the error to a queue of pending error(s) (stage 620). This queue may contain information about the type(s) of error(s) and/or other contextual information about the error(s). The user may continue using the application or enterprise solution despite the presence of unresolved error(s). Before saving in a final form, such as by finalizing a purchase order, the application or enterprise solution may remind the user of the pending error(s) (stage 630). The user may then resolve the error(s) (stage 480). If the error or errors are resolved, the program may complete the error validation cycle (stage 440).

Instead of the application or enterprise solution reminding the user of the error(s), the user may request to view the queue of pending error(s) (stage 640). The queue of pending errors may, for example, be sorted by their importance to the user. What is important to one user may differ from what is important to another user, so the sorting may comprise any method of prioritization that may help the user determine the order in which to address the errors, and may take into account the user's traits in determining the importance of the errors. For example, the errors may be prioritized by the severity of the error, the type of error (e.g., missing-but-required data, dependency, etc.), or the chronology in which the errors occurred if more than one error is in the queue.

A number of methods for resolving error(s) (stage 480) exist. The user may resolve the error(s) herself. If the user does not have authorization to correct the error(s) (e.g., the user cannot create new entries in a database), the user may be provided an interface option, such as a link, to request that an authorized user create a new database entry. The user making the request may then be notified when the authorized user has created the entry.

Errors, particularly dependency errors, can potentially involve more than one field. These fields may reside in several different portions of the application or enterprise solution. Thus, a user may need to navigate throughout the application to see multiple data fields that are in fact related to the same error. Consequently, the user is forced to engage is several steps to even find the relevant information. Once the information is located, the multiple fields are not displayed to the user at the same time, making it difficult for the user to determine the relationship between the fields. To alleviate this problem, a messaging system consistent with the present teachings may provide the user with an option to merge several entry windows or panes into one window or pane, so that a user can more readily determine the relationship between the data fields.

Figure 7:
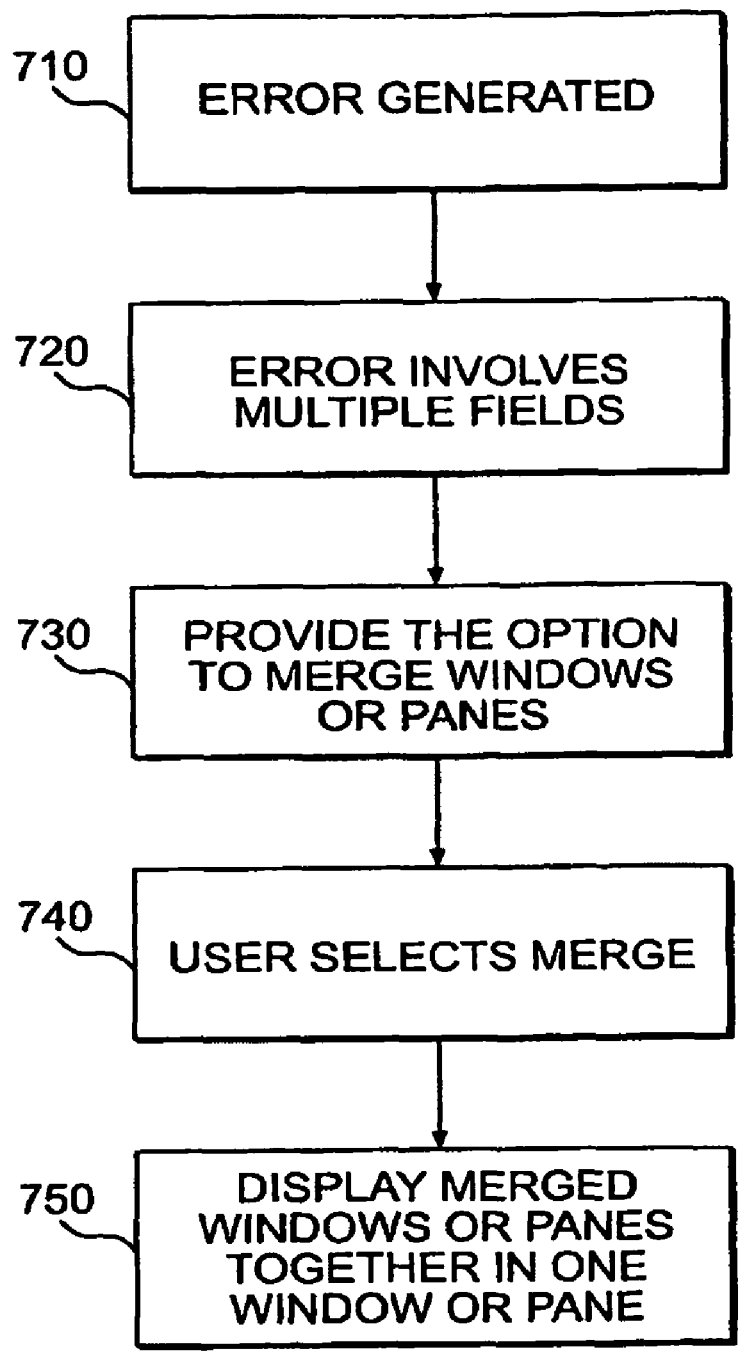
FIG. 7 is a process flow diagram of a messaging system that allows a user to merge related process step display screens.

Turning to FIG. 7, a flowchart illustrates an exemplary process flow consistent with the merging aspect of the present teachings. An error is generated by the user (stage 710). The system may determine whether the error involves a single field or multiple fields (stage 720) that a user would ordinarily only be able to view in separate windows or panes. If the error involves only a single field, no merge is needed.

If the error involves multiple fields, the user may be provided the option to merge the windows or panes of related fields so that the relationship between fields can be readily determined (stage 730). If the user selects the merge option (stage 740), the windows or panes containing related fields may be merged together and displayed in a single window or pane (stage 750). If the viewing window or pane is large enough, all of the merged windows or panes may appear on the display device simultaneously. If not, the merged windows or panes may appear in the same window or pane, but scrolling may be required to see all of the information. Even where scrolling is required, placing the information in a single window or pane simplifies a user's task by pushing the necessary data to the user, resulting in efficient error resolution. The window or pane may also provide the user with links to the portions of the pane containing the necessary data.

In a manner similar to that just described, a user may also merge panes or portions of panes in stages of a guided activity into one window or pane. This window or pane could be, for example, a completely new window (independent of the guided activity) or a new window within the guided activity. Typically, stages of a guided activity are displayed sequentially in separate windows or panes. However, a user may wish to view multiple panes or portions of panes of different stages of a guided activity at one time. The user may be presented with an option to merge the stages of a guided activity so that they may all be viewed in the same window or pane. Providing a user with such an option allows the user to tailor the computing environment to his or her needs, often resulting in increased user efficiency.

Figure 8:
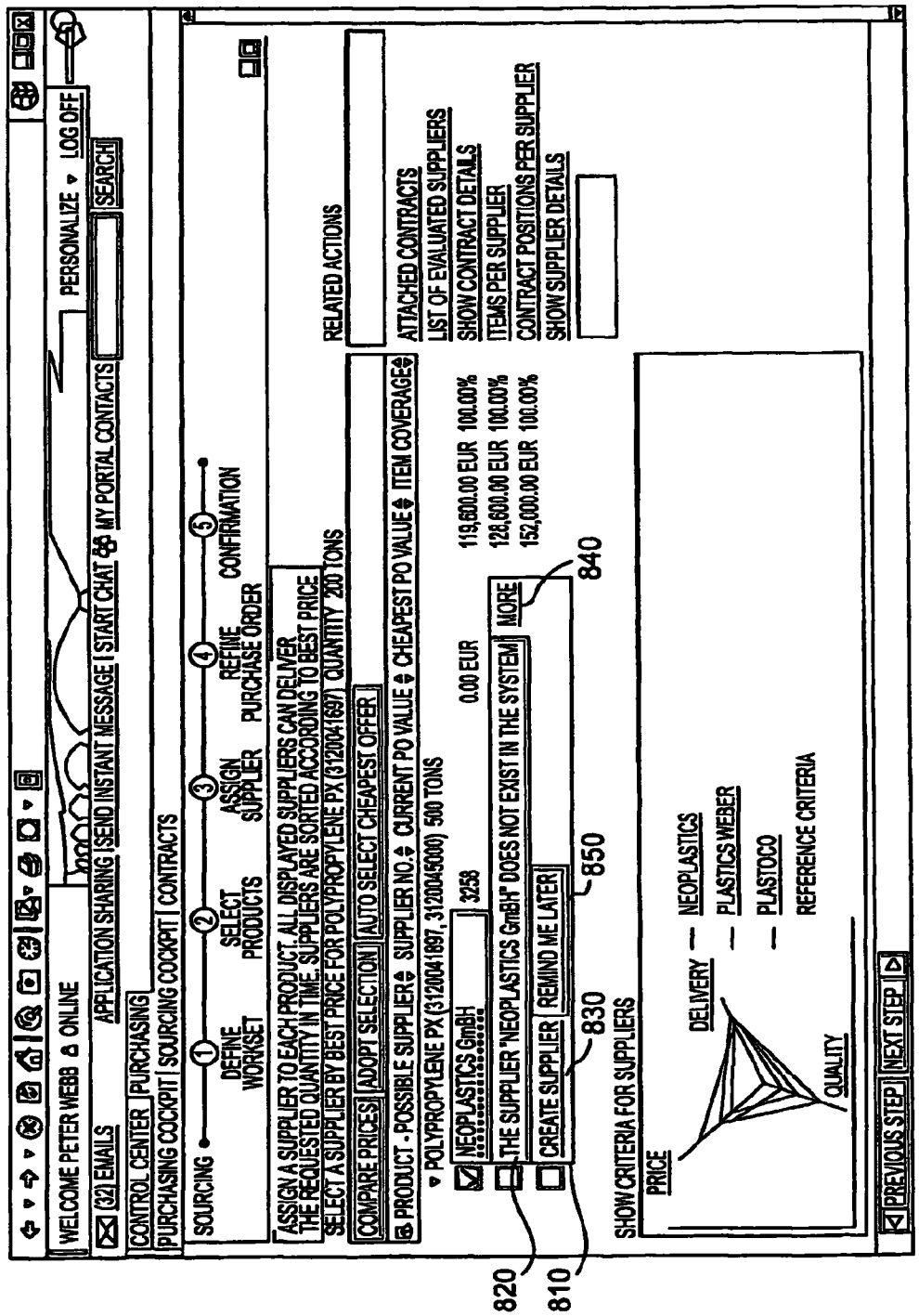
FIG. 8 represents a screenshot of an exemplary graphical display containing an error message in response to a request-for-missing-data error.

Messaging consistent with the present teachings may be more fully understood through the following discussion of a user navigating through exemplary error messages. FIGS. 8-16 represent screen shots illustrating a user's perspective of an enterprise solution utilizing an error messaging method consistent with the present disclosure. Specifically, FIG. 8 represents a screen shot of a user interface containing an exemplary error message 810 that may be displayed when the user attempts to proceed through this exemplary guided activity. The content of this error message may depend on the type of error or the user's traits (e.g., role or authorization level). In this example, the user is notified that "supplier 'Neoplastics GmbH' does not exist in the system" 820.

The enterprise solution has determined that the user has authorization to add suppliers to the supplier database, so it displays "Create supplier" link 830. The message also includes "More" link 840, which may direct the user to additional information or tools to assist in error resolution. Finally, in this example, the displayed error message includes a "Remind me later" button 850.

Figure 9:
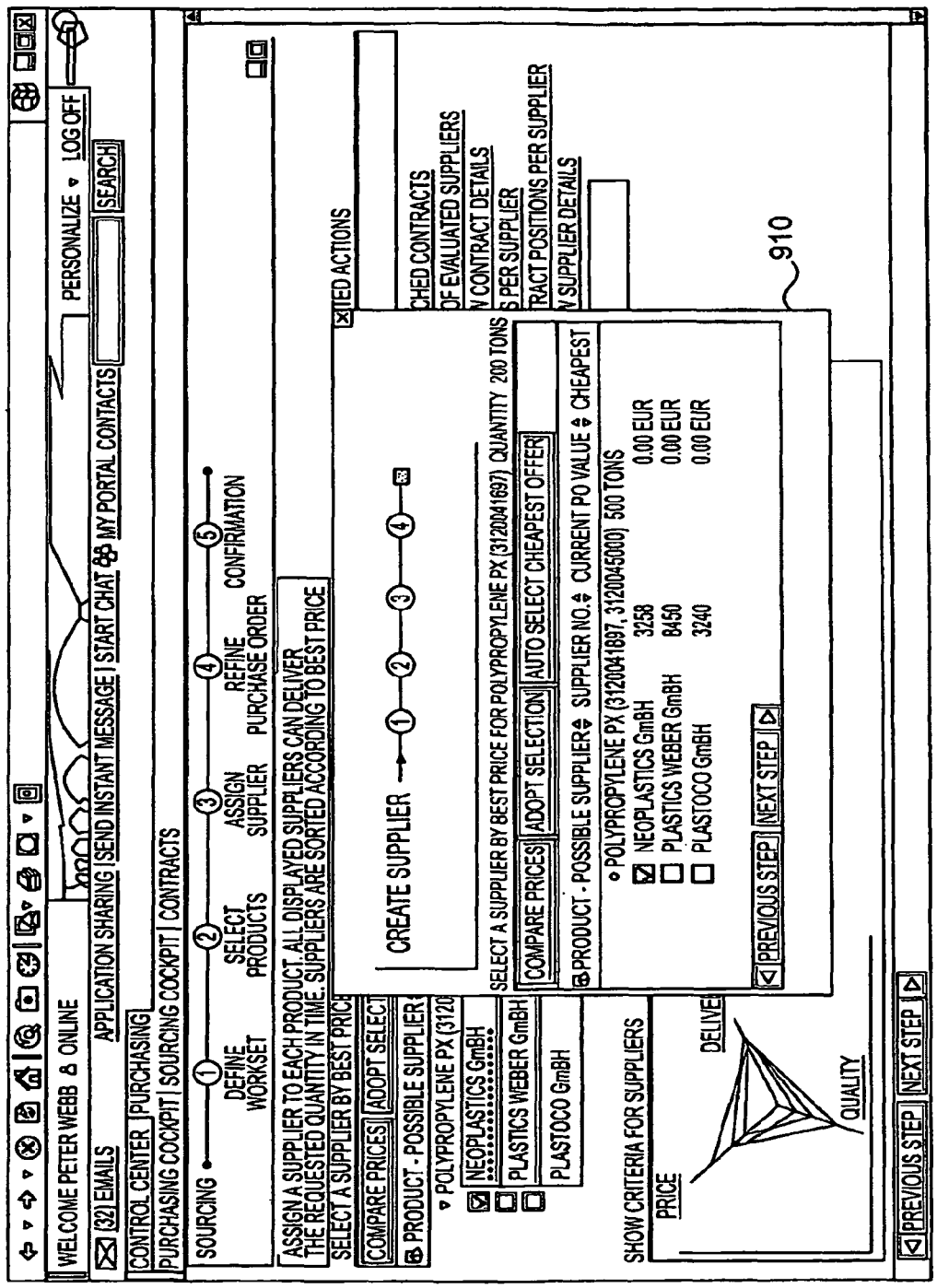
FIGS. 9 and 10 represent screenshots of exemplary graphical displays containing error resolution tools for resolving a request-for-missing-data error.

If the user selects the "Create supplier" link, the enterprise solution may enter the "Create Supplier" wizard 910, as illustrated in FIG. 9. (The wizard is just one example of an appropriate dialog.) This supplier creation wizard allows the user to add a new supplier to the supplier database, thus resolving the error. After the user has resolved the error, she is able to proceed to the next stage of the sourcing wizard. As demonstrated, one wizard (e.g., the supplier creation wizard) may be called to resolve an error generated by another wizard (e.g., the sourcing wizard). Although this example pertains to messaging within wizards, messaging consistent with the principles of this disclosure is not limited to messaging within wizards.

Figure 10:
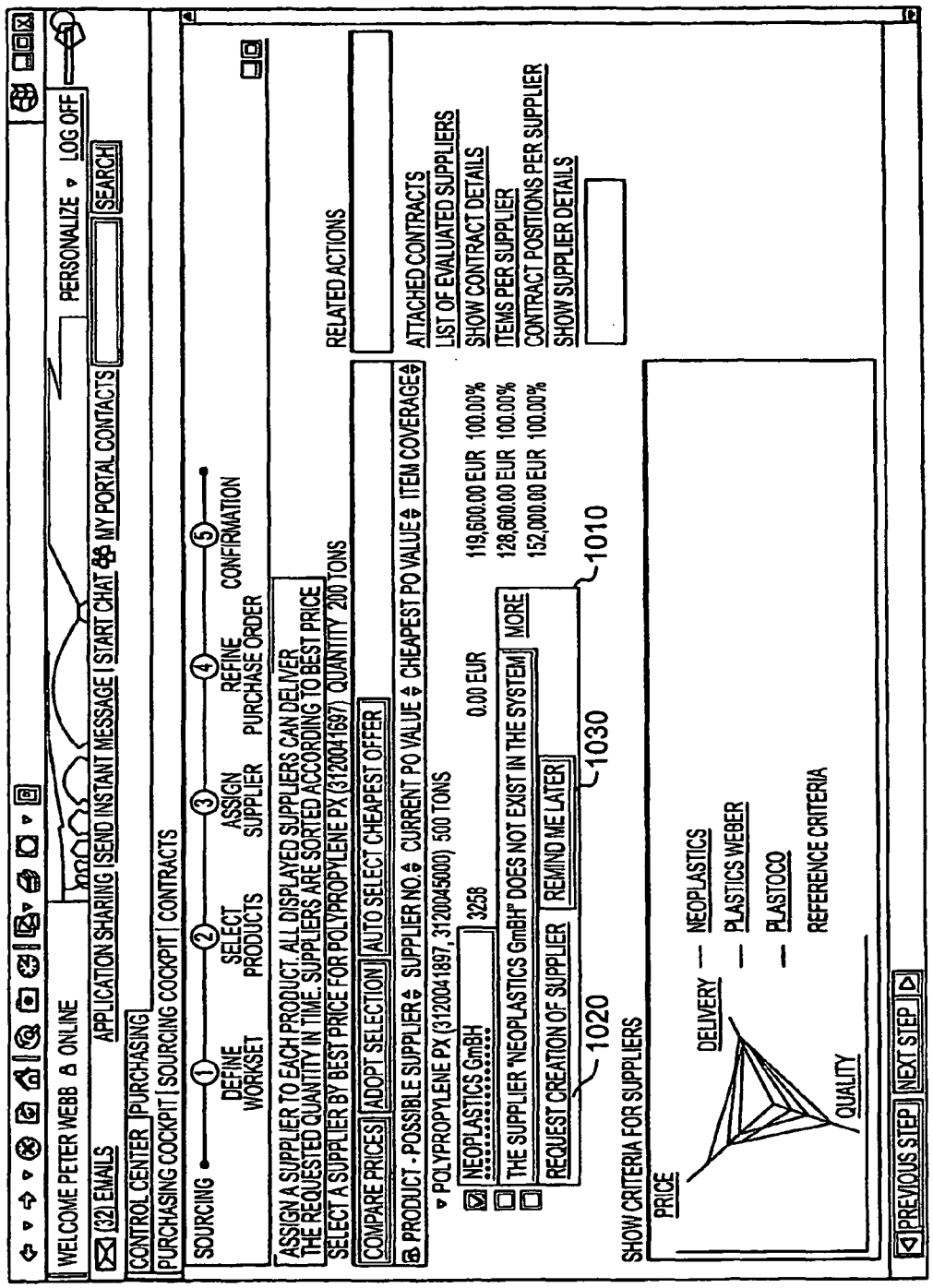

FIG. 10 illustrates an error message 1010 that may be displayed if the user does not have authorization to create a new supplier. Instead of a "Create supplier" link 810, the enterprise solution may instead display a "Request creation of supplier" link 1020. In this example, the error message is otherwise identical to error message 810. When the user selects "Request creation of supplier" link 1020, the enterprise solution will display the tools necessary to request the creation of a supplier from a user who has authorization to do so. Sending this request, however, does not resolve the error as the new supplier is still not in the database. Depending on how quickly the user's request is processed, there may be a delay before the new supplier is added to the database and the error resolved. After placing the request, the user may select the "Remind me later" button 1030 to defer resolution of the error until a later time. Selecting "Remind me later" adds the unresolved error to a queue of pending errors.

Once Neoplastics GmbH has been added to the database, thus resolving the missing data error, a dependency error may emerge because new supplier Neoplastics GmbH does not match the order or product already entered in the database. The error messaging system may assist the user in determining which entry or entries to correct.

Figure 11:
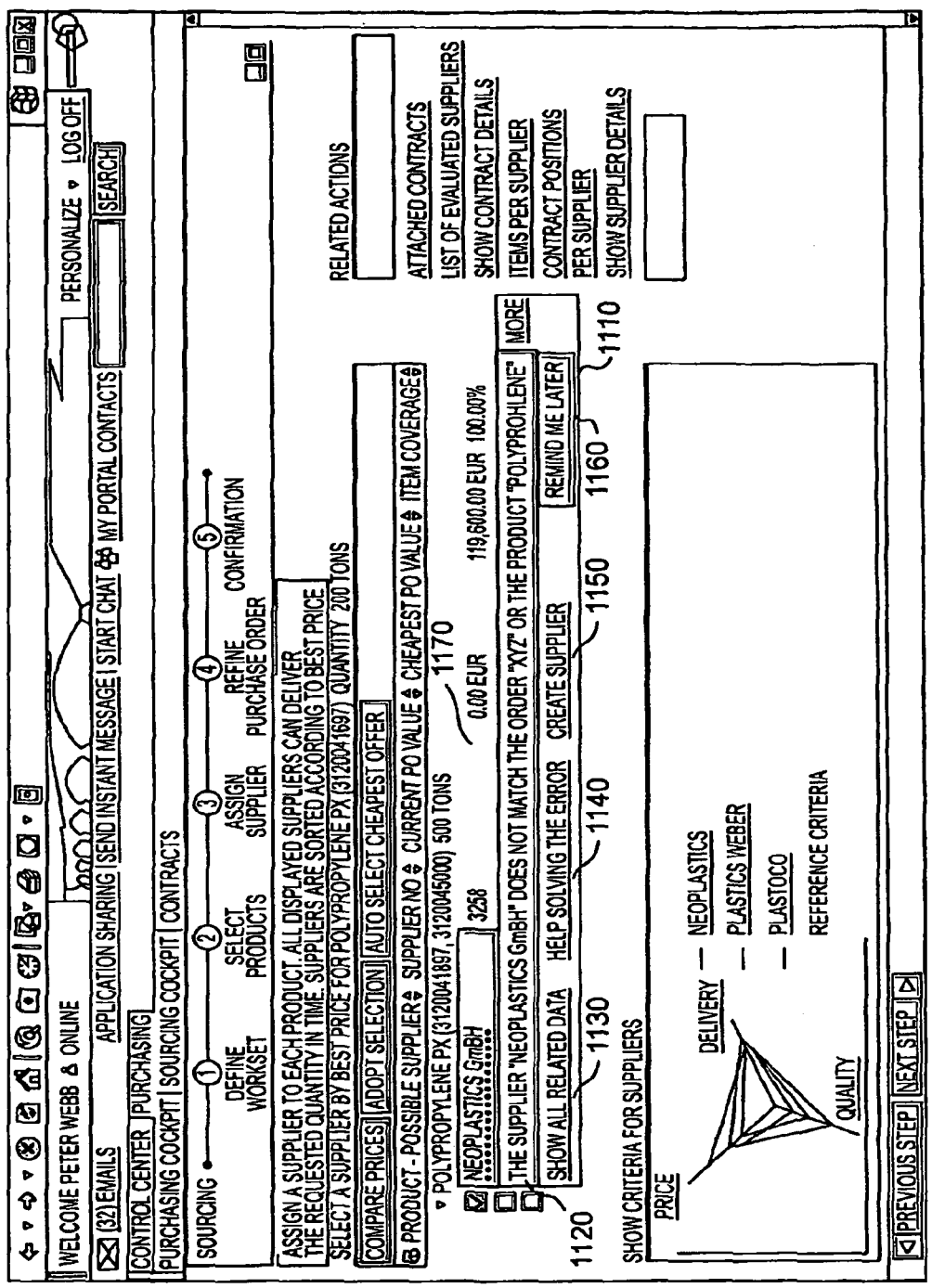
FIG. 11 represents a screenshot of an exemplary graphical display containing an error message in response to a dependency error.
Figure 12:
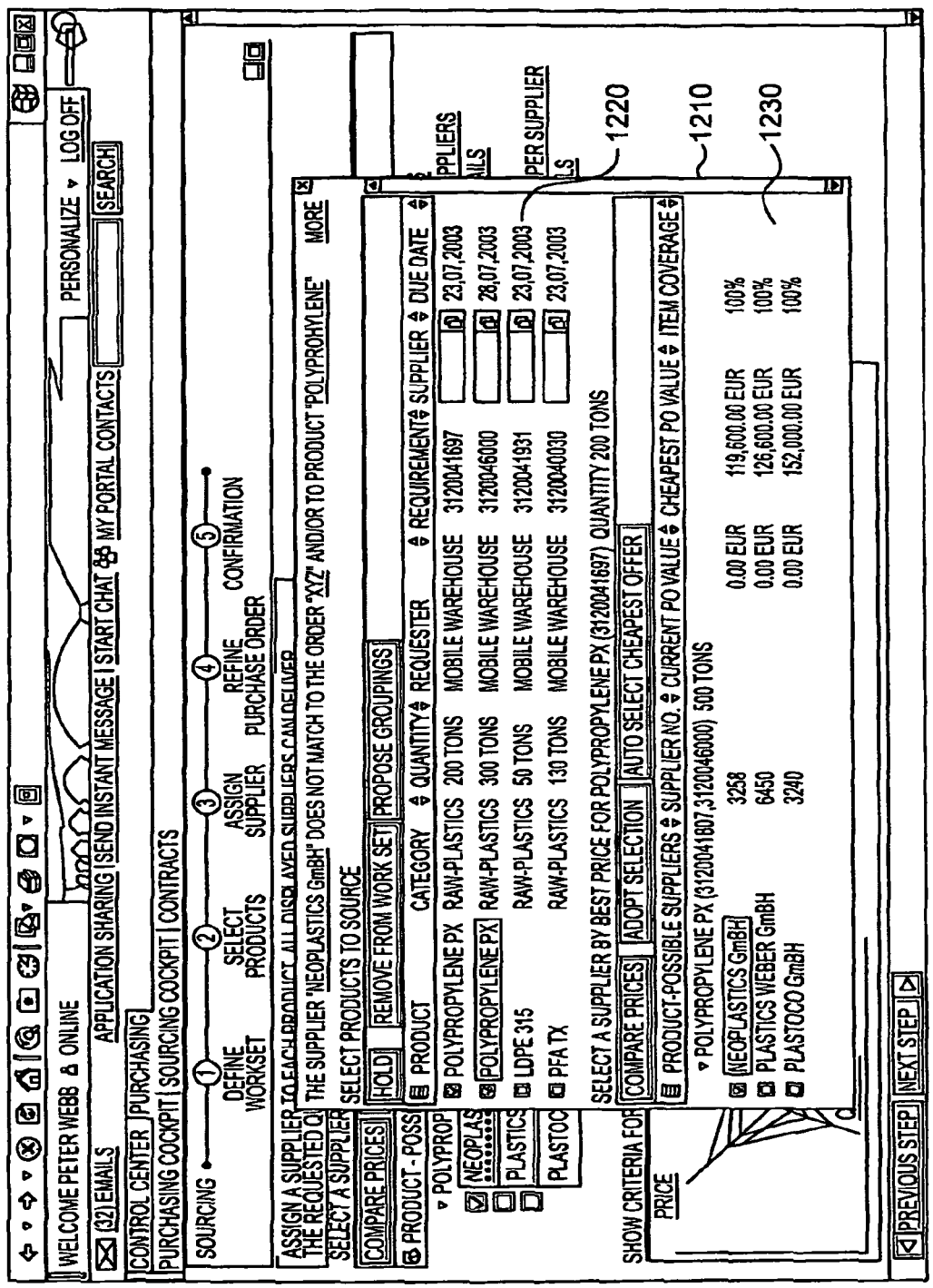
FIGS. 12, 13, and 14 represent screenshots of exemplary graphical displays containing error resolution tools for resolving dependency errors.

FIG. 11 illustrates an exemplary dependency error message 1110. Error message text 1120 notifies the user of the dependency error. If the user selects "Show all related data" link 1130, the enterprise solution may display order and product information, as illustrated in pane 1210 of FIG. 12. Here, the user can view the relationship between the data to help resolve the dependency error.

Figure 13:
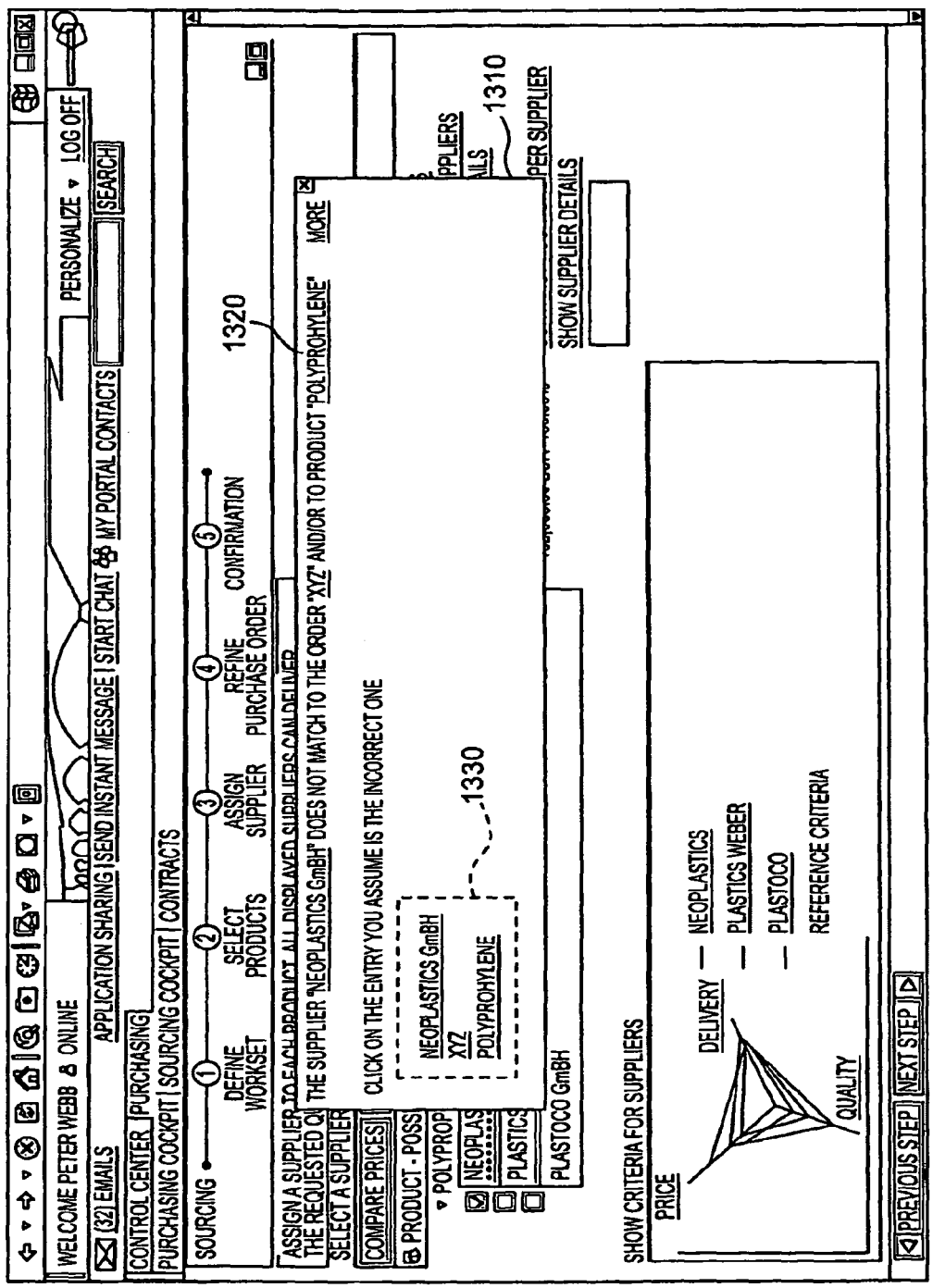

If the user selects "Help solving the error" link 1140, the enterprise solution may display pane 1310 of FIG. 13. As illustrated, this pane may repeat error message text 1120 at 1320. The pane may also contain a list of fields 1330 that are potentially involved in the dependency error. The user may be instructed to select the entry that she believes is incorrect. Once the user selects an item from the list, the enterprise solution may provide a tool to assist the user in resolving the error.

Figure 14:
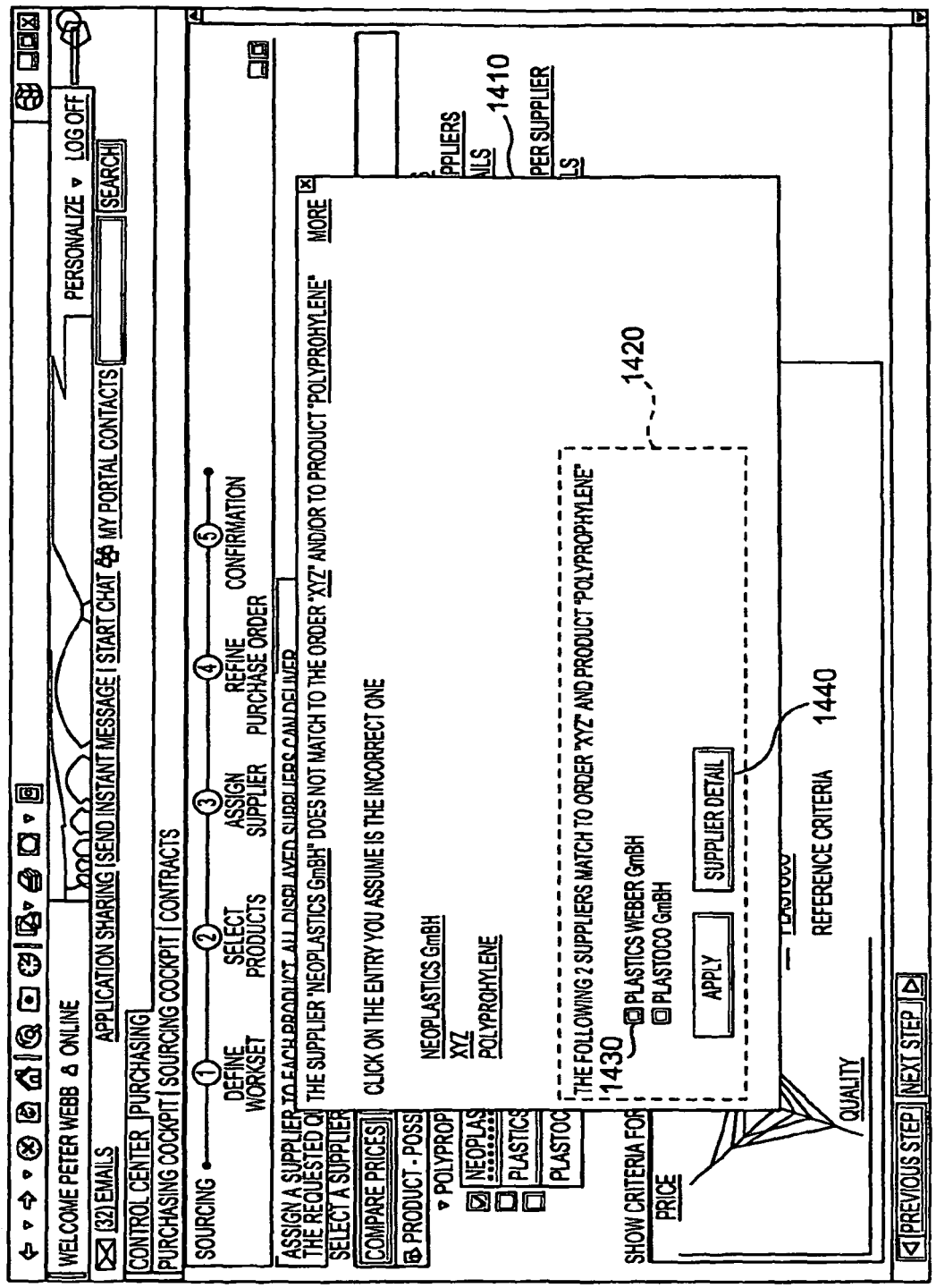

In this example the user selects "Neoplastics GmbH," and the enterprise solution displays pane 1410 of FIG. 14. In section 1420, the user is provided a list of suppliers that the database recognizes as relating to the desired order and product. In this manner, the user can quickly determine which supplier to select. By selecting checkbox 1430 and the "Apply" button, the user can resolve the dependency error. If the user would like additional information about a supplier, she can select "Supplier detail" button 1440.

At this stage, most users have been provided with the tools necessary to resolve the dependency error and will in fact have done so. If the user does not have the time or resources to resolve the error, the user may defer resolving the error by selecting "Remind me later" button 1160, as illustrated in FIG. 11.

Figure 15:
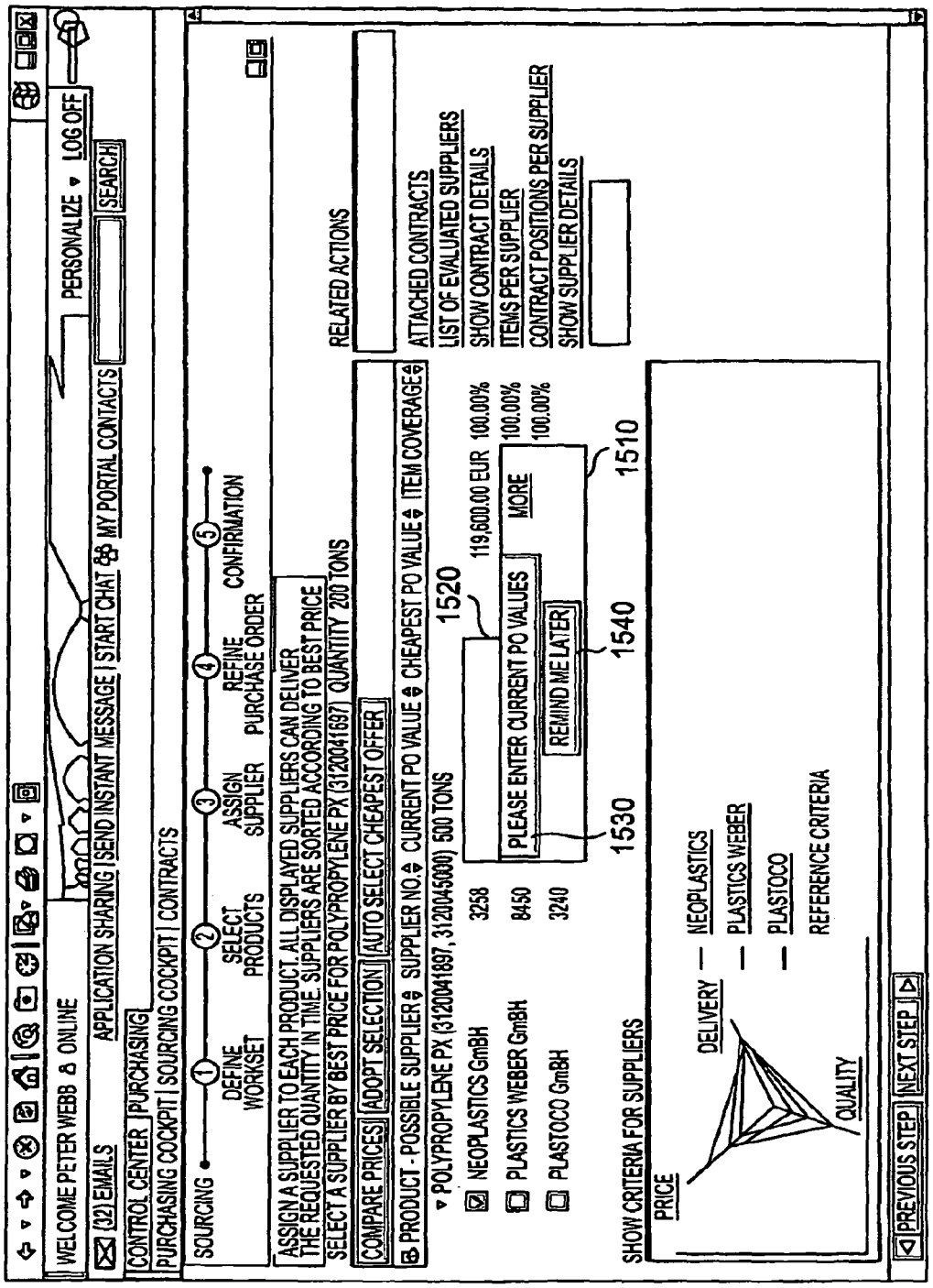
FIG. 15 represents a screenshot of an exemplary graphical display containing an error message in response to a missing-but-required-entry error.

In this example, the enterprise solution detects an additional error—that the user has not entered "Current PO Value" 1170. Because "Current PO Value" is a required field, a missing-but-required-entry error occurs. Upon detecting this error, the enterprise solution may display pane 1510 as illustrated in FIG. 15. Note that the pane appears immediately below the field containing the error 1520. Thus, the error messaging system may graphically assist the user in quickly determining which field contains the error. Message 1530 may instruct the user to enter a value in field 1520. The user may do so, or the user may defer resolution of this error by selecting "Remind me later" button 1540.

If the user selects "Remind me later" button 1540, the user may proceed to the next stage of the wizard if no other errors are detected. Here, no other errors are detected and the user selected "Remind me later" button 1540, so the user may proceed to stage 4 of the sourcing wizard.

Figure 16:
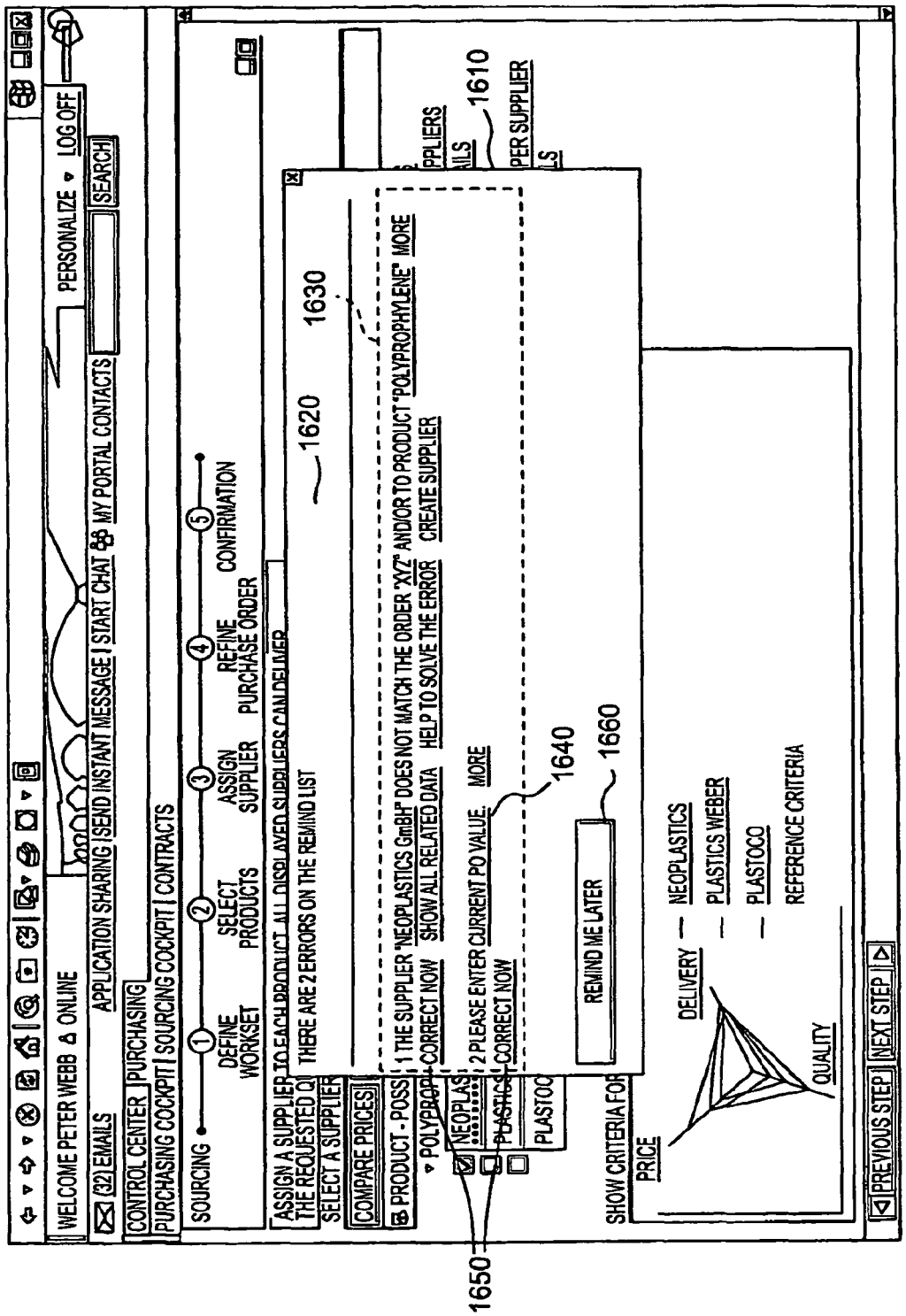
FIG. 16 represents a screenshot of an exemplary graphical display containing a message reminding the user of unresolved errors.

Before the user reaches the last stage of the sourcing wizard where she may save the completed purchase order, the user may be reminded of the two pending errors. Pane 1610 of FIG. 16 illustrates one example of how the application or enterprise solution may notify the user of the unresolved errors. Title 1620 may notify the user that two errors await resolution. Portion 1630 of pane 1610 describes the unresolved dependency error and provides tools similar to those displayed in FIG. 11. Portion 1640 describes the unresolved missing-but-required-entry error. In both 1630 and 1640, the user is provided "Correct now" link 1650 to resolve the error. If the user corrects all pending errors, the user may save the completed purchase order. However, the user may choose to again defer resolution of the errors. The user may correct the errors to finalize the purchase order entry at some point in the future.

Those skilled in the art will appreciate that all or part of the described systems and methods may be stored on or read from other computer-readable media, such as: secondary storage devices, like hard disks, floppy disks, and CD-ROM discs; a carrier wave received from the Internet; or other forms of computer-readable memory, such as read-only memory (ROM) or random-access memory (RAM).

Furthermore, One skilled in the art will also recognize that the processes illustrated in this description may be implemented in a variety of ways and include multiple other modules, programs, applications, scripts, processes, threads, or code sections that all functionally interrelate with each other to accomplish the individual error messaging described above. For example, it is contemplated that the described error messaging systems may be implemented using commercially available software tools, using custom object-oriented code written in the C++ or C# programming languages, or using applets written in the Java programming language.

Figure 17:
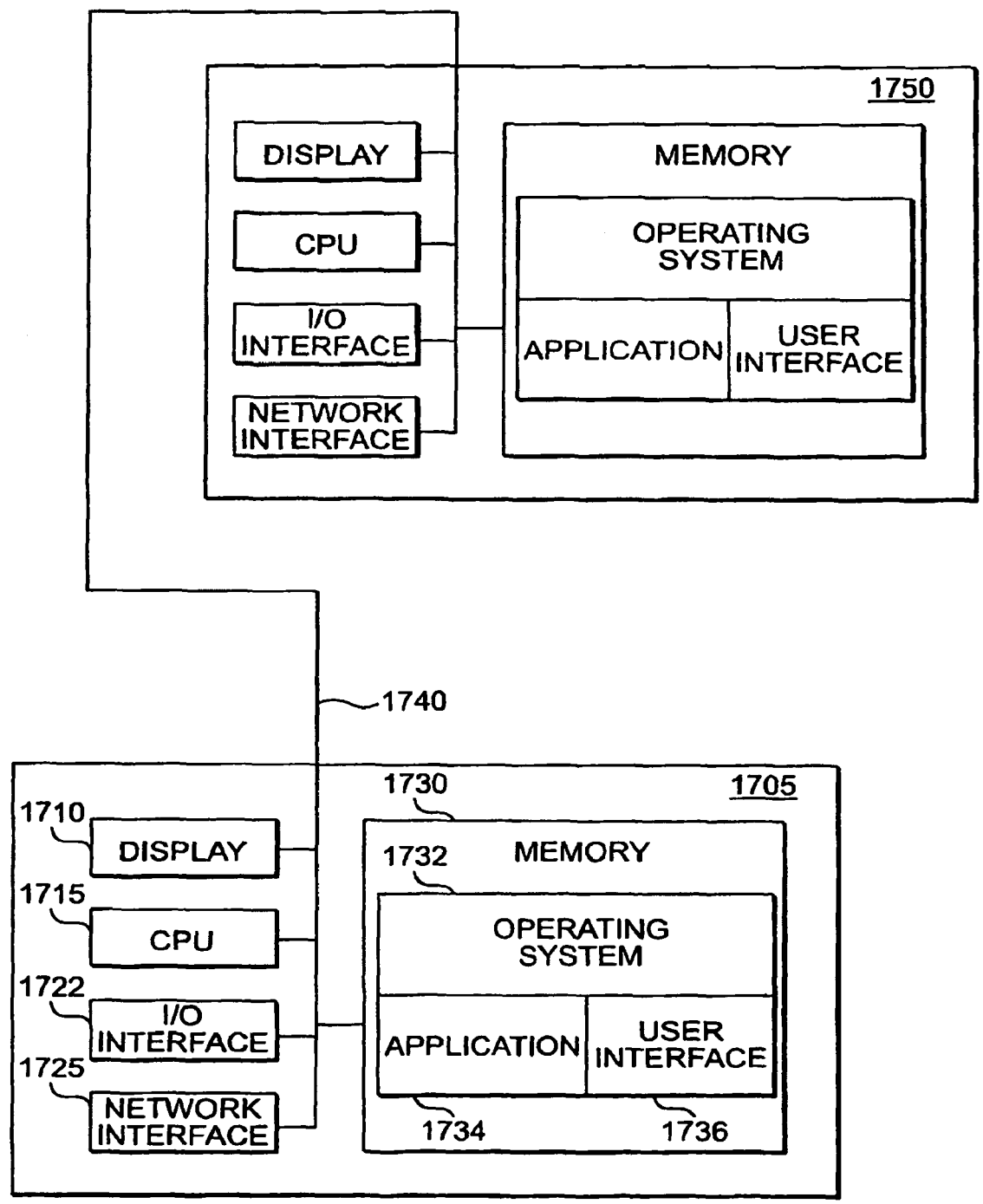
FIG. 17 illustrates an exemplary client/server architecture capable of utilizing a messaging system consistent with the principles disclosed herein.

As exemplified in FIG. 17, the error messaging described above may operate on a client system 1705 or a server system 1750, or a combination of the two. Client 1705 may be a general-purpose computer, personal digital assistant, terminal, workstation, or a specially constructed computing platform for carrying-out the error messaging operations previously described. Client 1705, having CPU 1715, may provide the error messaging to the user and associated communications with necessary databases, structured data, unstructured data, and metadata via I/O interface 1722 (which can be any conventional I/O device) or network interface 1725 (which can be any conventional interface) by direct connections or other communication links. Client 1705 may also provide a local or remote display 1710.

Alternatively, client 1705 can be part of a network, such as a telephone-based network (such as a PBX or POTS), a local area network (LAN), a wide area network (WAN), a dedicated intranet, and/or the Internet. In this way, client 1705 may be located near or far from any necessary documents or databases.

Memory device 1730 may be implemented with various forms of memory or storage devices, such as read-only memory, random access memory, or external devices. Typically, memory device 1730 stores instructions forming an operating system 1732; one or more application modules 1734 for providing database and user application functions; and a user interface module 1736 for providing the error messaging to the user.

Operating system 1732 may be, for example, Windows Longhorn, Windows XP, Apple's OS X, Linux, or Unix. User interface module 1736 may be designed to work in concert with the one or more application modules 1734. With such a design, the user interface module 1736 does not need to be redesigned or duplicated to work in each application module 1735. Such a design enables a common "look and feel" to be present across multiple applications.

As previously mentioned, FIG. 17 also illustrates server 1750. Client 1705 may access server 1750 to run applications residing on server 1750. Client 1705 may do so through connection 1740. Connection 1740 may be, for example, a wide area network, a local area network, or the Internet. Server 1750 operates comparably to the above description of client 1705. The messaging features of the present teachings may be found on either client 1705, server 1750, or a combination of the two devices.

The foregoing description of possible implementations consistent with the present invention does not represent a comprehensive list of all such implementations or all variations of the implementations described. The description of only some implementation should not be construed as an intention to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

What is claimed is:

1. A method of providing a user interface messaging system comprising:
   determining a user role associated with a user;
   preparing an error message based on the user role;
   displaying a first message on a display device in a message layer, wherein the message involves data from a plurality of separate information entry forms and the displayed first message consolidates the information entry forms into a single window pane and partially pre-fills the information entry forms for ease of message resolution;
   providing the user, in the single window pane, at least one link to a portion of the window pane containing the information entry forms related to the error message;
   receiving a command from the user to defer resolution of the substance of the first message; and
   adding the first message to a queue that thereafter comprises the first message.

2. The method of claim 1 further comprising:
   reminding the user to resolve the substance of the first message.

3. The method of claim 1 further comprising:
   closing the layer that comprises the first message.

4. The method of claim 1 wherein the substance of the first message relates to an error.

5. The method of claim 4 wherein the error is user-initiated.

6. The method of claim 1 further comprising:
   displaying a second message on a display device in a message layer;
   receiving a command from a user to defer resolution of the substance of the second message; and
   adding the second message to the queue that thereafter comprises the first message and the second message.

7. The method of claim 1 wherein the message layer adjoins a database field on the display device.

8. The method of claim 1 wherein the message layer is movable.

9. The method of claim 1 wherein the message layer is displayed using at least one visual effect to catch the user's attention.

10. The method of claim 9 wherein the visual effect comprises growing the message layer outward from a starting point until the entire layer is displayed.

11. A non-transitory computer-readable medium comprising instructions, the execution of which cause a computer to perform the method comprising:
    determining a user role associated with a user;
    preparing an error message based on the user role;

displaying a first message on a display device in a message layer, wherein the message involves data from a plurality of separate information entry forms and the displayed first message consolidates the information entry forms into a single window pane and partially pre-fills the information entry forms for ease of message resolution;

providing the user, in the single window pane, at least one link to a portion of the window pane containing the information entry forms related to the error message;

receiving a command from the user to defer resolution of the substance of the first message; and adding the first message to a queue that thereafter comprises the first message.

12. The computer-readable medium of claim 11 wherein the performed method further comprises:

reminding the user to resolve the substance of the first message.

13. The computer-readable medium of claim 11 wherein the method performed by the execution of the instructions further comprises:

closing the layer that comprises the first message.

14. The computer-readable medium of claim 11 wherein the substance of the first message relates to an error.

15. The computer-readable medium of claim 14 wherein the error is user-initiated.

16. The computer-readable medium of claim 11 wherein the method performed by the execution of the instructions further comprises:

displaying a second message on a display device in a message layer;

receiving a command from a user to defer resolution of the substance of the second message; and adding the second message to the queue that thereafter comprises the first message and the second message.

17. The computer-readable medium of claim 11 wherein the message layer adjoins a database field on the display device.

18. The computer-readable medium of claim 11 wherein the message layer is movable.

19. The computer-readable medium of claim 11 wherein the message layer is displayed using at least one visual effect to catch the user's attention.

20. The computer-readable medium of claim 19 wherein the visual effect comprises growing the message layer outward from a starting point until the entire layer is displayed.

* * * * *